United States Patent [19]

Talbot

[11] Patent Number: 4,763,783
[45] Date of Patent: Aug. 16, 1988

[54] SHRINK FILM PACKAGING FOR AN ASSEMBLED AIRCRAFT OR PORTION THEREOF AND METHOD OF MAKING THE SAME

[75] Inventor: James E. Talbot, Wynnewood, Pa.

[73] Assignee: Fana, Inc., Springfield, Pa.

[21] Appl. No.: 87,483

[22] Filed: Aug. 19, 1987

[51] Int. Cl.$^4$ ............................................. B65D 85/68
[52] U.S. Cl. ...................... 206/335; 53/419; 53/442; 53/461; 53/472; 53/434; 150/52 K; 206/497; 52/3
[58] Field of Search ............... 52/3; 53/419, 434, 442, 53/472, 461, 557; 150/52 R, 52 K; 206/33 J, 497; 135/88

[56] References Cited

U.S. PATENT DOCUMENTS

| | | |
|---|---|---|
| 2,506,501 | 5/1950 | Harper . |
| 2,717,017 | 9/1955 | Feasey . |
| 3,044,516 | 7/1962 | Stoll . |
| 3,385,337 | 5/1968 | Rossini et al. . |
| 3,429,095 | 2/1969 | Huson ............................ 206/497 X |
| 3,488,913 | 1/1970 | Burgess .......................... 206/497 X |
| 3,618,755 | 11/1971 | Kean ................................. 53/472 X |
| 3,653,497 | 4/1972 | Hornstein . |
| 3,750,872 | 8/1973 | Robb . |
| 3,783,766 | 1/1974 | Boucher . |
| 3,815,313 | 6/1974 | Heisler .......................... 206/497 X |
| 3,815,650 | 6/1974 | Hickey . |
| 3,820,205 | 6/1974 | Shaw . |
| 4,095,760 | 1/1978 | Sommer et al. . |
| 4,247,509 | 1/1981 | Talbot . |
| 4,598,883 | 7/1986 | Sutter . |
| 4,606,516 | 8/1986 | Willison . |

FOREIGN PATENT DOCUMENTS

| | | |
|---|---|---|
| 2320207 | 1/1961 | Fed. Rep. of Germany . |
| 1097825 | 11/1974 | Fed. Rep. of Germany . |
| 54-7303 | 5/1979 | Japan . |
| 1439051 | 6/1976 | United Kingdom . |
| 2038776 | 7/1980 | United Kingdom . |

OTHER PUBLICATIONS

Advertisement of Mobil Chemical Company for "Mobilrap" from *Packaging* Magazine, Aug., 1984, pp. 66–67.

Primary Examiner—John Sipos
Attorney, Agent, or Firm—Panitch Schwarze Jacobs & Nadel

[57] ABSTRACT

A method of shrink film packaging an assembled aircraft or portion thereof for transport, storage or the like comprises the steps of covering exposed jagged or sharp edges and discontinuities, exposed irregularly shaped areas, and exposed heat-sensitive components of the aircraft with a foam material. The aircraft is then wrapped with a plurality of separate sections of heat-shrinkable polymer film with adjoining sections partially overlapping to provide a generally continuous covering. Heat is then applied to the heat-shrinkable film sections to shrink the film to tightly conform to the aircraft, to fuse together overlapping film sections and to fuse portions of the film to adjoining foam material. Elongated strips of heat-shrinkable material are then applied along seams formed by the fusing together of the overlapping film sections. Finally, heat is applied to the elongated strips to shrink and fuse the strips to the film sections on both sides of the seams to seal and reinforce the seams. The invention also comprises shrink film packaging for an aircraft of the type described above.

21 Claims, 3 Drawing Sheets

SHRINK FILM PACKAGING FOR AN ASSEMBLED AIRCRAFT OR PORTION THEREOF AND METHOD OF MAKING THE SAME

BACKGROUND OF THE INVENTION

The present invention relates to shrink-film packaging and, more particularly, to shrunk-on packaging for an assembled aircraft or portion thereof and a method of making the same utilizing heat-shrinkable polymer film.

Aircraft, particularly modern, sophisticated rotary aircraft (such as helicopters) and collapsible wing aircraft used on ships are highly susceptible to environmentally induced damage caused by dust, dirt, air borne particles or the like which may enter and disrupt delicate hydraulic and instrumentation systems, as well as other operational systems, particularly during extended periods of non-operational storage. In addition, aircraft of this type, as well as any other types of aircraft, are susceptible to damage caused by wind, rain, sleet and other weather factors, as well as corrosion, etc., which may occur during prolonged shipment from one facility to another, particularly if such shipment is overseas, for example, from the United States to Europe. Such damage may be exacerbated if the aircraft is directly exposed to weather conditions, such as when the aircraft is shipped on the top or upper deck of a ship.

In the past, large preformed shipping covers made of canvas or some other weather-resistant material were either sprayed or installed over aircraft of this type for extended storage periods and/or for shipment, particularly shipment overseas. However, such covers or spray-on materials were heavy and clumsy, making them difficult and relatively time-consuming to install and/or remove. In addition, such covers were relatively expensive, thereby significantly increasing the cost involved in storing and/or shipping an aircraft utilizing such covers. Once the preformed covers were removed from the aircraft they had to be washed, dried and specially packed, thereby incurring additional time and expense. Moreover, while such covers functioned reasonably well, they were installed upon the aircraft utilizing strapping, belting and the like and, therefore, were not airtight. Therefore, additional special precautions had to be taken, particularly when shipping aircraft overseas, to prevent moisture and vapor penetration and/or corrosion.

The present invention overcomes many of the disadvantages inherent in the above-described aircraft covers by providing shrunk-on film packaging for an aircraft which is comprised of a polymer film applied to tightly conform to the aircraft to provide a strong, generally airtight cover. The packaging of the present invention can be installed on an aircraft within a relatively short period of time and provides good protection from dust, debris and weather, as well as from moisture and vapor penetration. The packaging of the present invention is also easily removed after storage or shipment of the aircraft and is readily disposable. Moreover, use of the present invention results in considerable savings in money as well as time for installation and removal.

SUMMARY OF THE INVENTION

Briefly stated, the present invention comprises shrunk-on packaging for an assembled aircraft or portion thereof, and a method of making the same, utilizing heat shrinkable polymer film. The method comprises the steps of covering the exposed jagged or sharp edges and discontinuities, exposed irregularly shaped areas, and exposed heat-sensitive components of the aircraft or portion thereof, with a foam material. The foam material provides cushioning to prevent puncturing of the film, heat insulation for the heat-sensitive components and anchoring areas for securing the film to the aircraft or portion thereof. The aircraft or portion thereof is wrapped with a plurality of separate sections of heat shrinkable polymer film. Adjoining sections of the film are at least partially overlapping to provide a generally continuous covering. The next step involves applying heat to the heat shrinkable film sections to shrink the film to tightly conform to the aircraft or portion thereof to provide a generally airtight covering, to fuse together the overlapping film sections and to fuse portions of the film to adjoining foam material. Next, elongated strips of heat shrinkable material are applied along seams formed by the fusing together of the overlapping film sections. Finally, heat is applied to the elongated strips to shrink and fuse the strips to the film sections on both sides of the seams to seal and reinforce the seams. The shrunk-on packaging is the package formed utilizing the foregoing method.

BRIEF DESCRIPTION OF THE DRAWINGS

The foregoing summary, as well as the following detailed description of preferred embodiments, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF PREFERRED EMBODIMENTS

Figure 1:
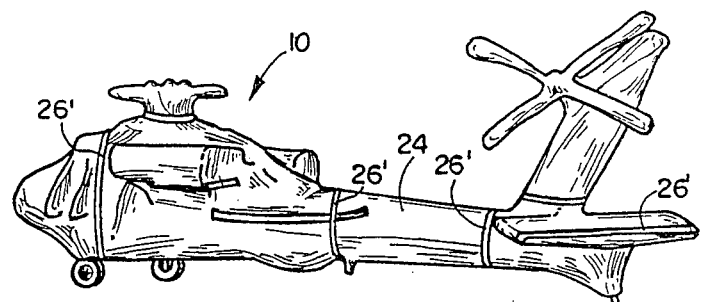
FIG. 1 is a perspective view of a helicopter with the main rotor blades removed to which has been applied shrunk-on film packaging in accordance with the present invention.
Figure 2:
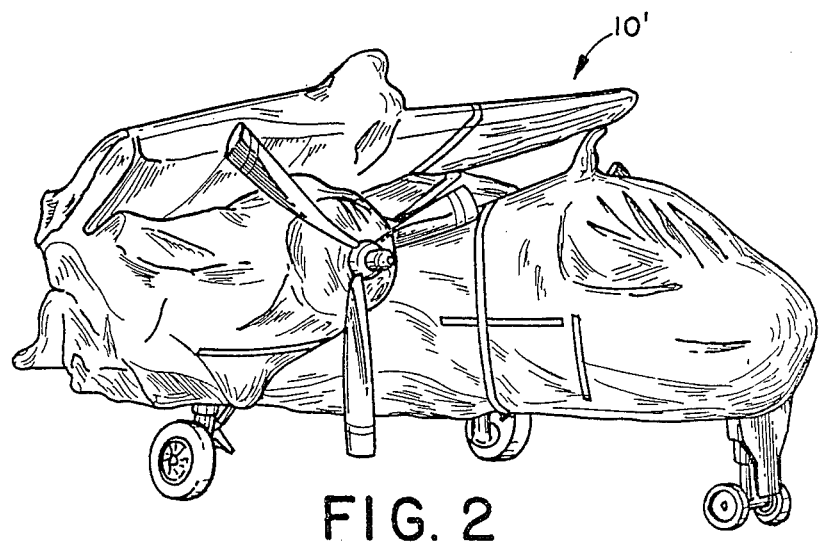
FIG. 2 is a perspective view of a portion of an airplane having foldable wings to which has been applied shrunk-on film packaging in accordance with the present invention.

Referring to the drawings, wherein like numerals indicate like elements throughout, there is shown in FIG. 1 a perspective view of an aircraft having shrunk-on packaging in accordance with the present invention. The aircraft shown in FIG. 1 is a U.S. Army A.H.-64A "Apache" helicopter 10. However, it should be clearly understood that the packaging and method of the present invention are equally applicable to any type of assembled aircraft, including large or small size fixed wing aircraft, Apache or other types of helicopters or rotary aircraft, VSTOL aircraft or the like. FIG. 2 is a perspective view of a portion of a U.S. Navy S-2 radar tracker airplane 10' having foldable wings (only one shown) which has been packaged in accordance with the present invention.

It will also be understood by those skilled in the art that the present invention is applicable for the packaging of any type of assembled aircraft or in packaging a desired portion or portions of such aircraft. For example, under some circumstances, it may be desirable to package merely the fuselage of the aircraft without regard to the wings, motors, etc.

The present invention utilizes shrink-film to provide the aircraft packaging. However, because most aircraft are unusual in shape, special methods and techniques must be employed to provide durable packaging which remains generally airtight, despite weather and/or unusual shipping conditions.

Figure 3:
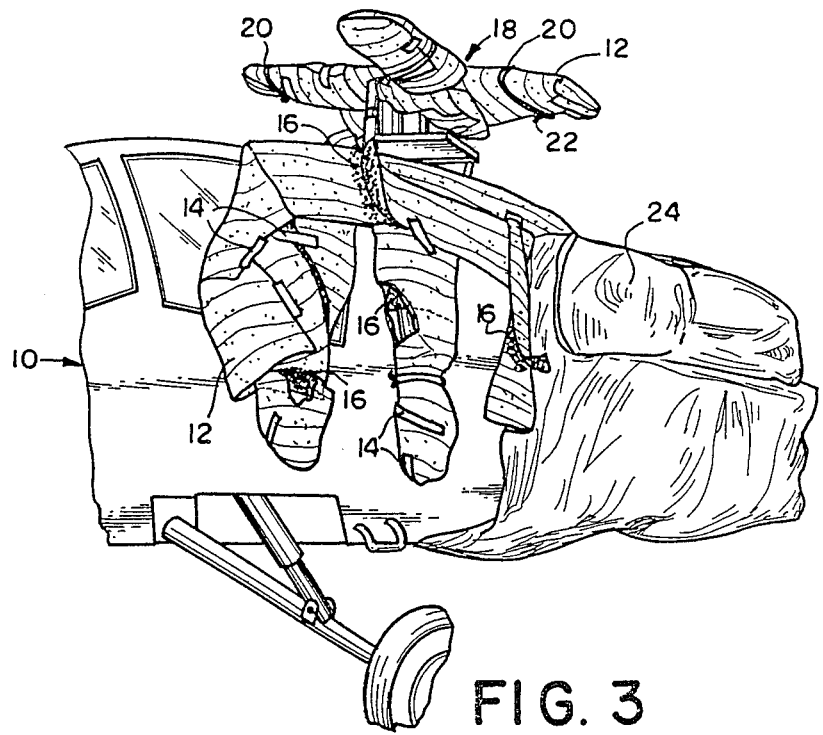
FIG. 3 is an enlarged perspective view of a portion of the helicopter of FIG. 1 showing installation of foam material.

The first step in packaging an aircraft 10 is covering exposed, jagged or sharp edges, geometric discontinuities such as outwardly extending bolts or the like, and irregularly shaped areas such as radar and other antenna, fins or the like, with a protective material, preferably a foam material 12 (see FIG. 3). A protective tape may alternatively be employed for covering small areas, such as exposed rivets (not shown). It is also desirable to cover components of the aircraft 10 which may be heat-sensitive, such as plastic rotor tips, exposed insulated wiring, plastic windshields and the like with the foam material 12. The foam material 12 provides cushioning and padding for the covered portions of the aircraft 10 and protects the shrink-wrap film from being cut or punctured, both during installation and, later, during storage or shipment. With respect to the heat-sensitive components, the foam material 12 insulates these components from the effects of heat as the shrink film is being applied, as will hereinafter be described. The foam material 12 and the tape, if employed, also provides anchoring areas or locking points at various places along the surface of the aircraft 12. As will hereinafter be described, the shrink film is fused to the foam material 12 to strengthen the film and to firmly anchor the film at the various places on the surface of the aircraft 10.

In the present embodiment, it is preferred that the foam material 12 be a unicellular, low density polyethylene foam, preferably complying with the requirements of Military Specification PPP-C 1752B, Type 7, Class 1. It is also preferred that the foam material 12 be at least one-fourth of an inch thick in order to provide the necessary padding, heat insulation and anchoring. However, as will be appreciated by those skilled in the art, any other type of foam material 12, compatible with the shrink film, could alternatively be employed. In addition, while in the present embodiment, it is preferred that the foam material 12 be in the form of a sheet of foam at least one-fourth inch thick and about forty-eight inches wide, the foam material 12 could be in some other form, for example, in a liquid or semi-liquid form (not shown) which could be sprayed or painted onto the various areas of the aircraft 10. Therefore, the present invention is not limited to the preferred form of foam material 12.

FIG. 3 shows the preferred foam material 12 covering various portions of the aircraft or helicopter 10 of FIG. 1. The foam material 12 may be secured to the various portions and components of the helicopter 10 in a variety of different manners, depending upon the specific circumstances. However, three securing methods are presently preferred. When applying the foam material 12 to an outwardly jutting component or edge, it is preferred that the foam material be wrapped around the outwardly jutting component or edge and secured utilizing elongated strips of an adhesively backed tape 14. The tape 14 may be applied to secure the foam to itself as shown in FIG. 3. Alternatively, the tape 14 may extend between the foam material 12 and the outer surface (not shown) of the aircraft 10. Accordingly, it is preferable that the tape 14 employ an adhesive which is strong enough to properly secure the foam material 12 to itself or to the surface of the aircraft 10 but yet is not so strong that the paint or other protective coating is pulled off of the aircraft 10 when the tape 14 is removed after storage and/or shipment. In addition, it is presently preferred that the tape 14 be made of a polyethylene material to permit the tape 14 to properly fuse to the shrink film upon application thereof. However, as will be appreciated by those skilled in the art, the tape 14 could be of any other suitable material. Likewise, it is presently preferred that the tape 14 be between two and six inches wide, but it could be of any other width, if desired.

As is also shown in FIG. 3, the foam material 12 could be secured to the various portions of the aircraft 10 utilizing a spray-on or brush-on adhesive 16. The adhesive 16, which is preferably rubber based, could be employed to secure the foam material 12 to itself as shown, or could be applied to secure the foam material 12 directly to an aircraft surface (not shown). Accordingly, the adhesive 16 must be strong enough to provide a good bond to firmly secure the foam material 12, but yet must not be so strong as to remove or otherwise damage the paint or other surface coating upon removal of the foam material 12 from the aircraft 10. While a rubber based adhesive is presently preferred, it will be appreciated by those skilled in the art that any other suitable compatible type of adhesive could alternatively be employed.

When the foam material 12 is wrapped around a fully exposed portion of the aircraft 10, such as the rotor blade supports 18, the foam material 12 may be secured utilizing an elongated self-locking band 20 which surrounds the foam material 12 and is secured to itself utilizing suitable attaching means, such as buckles 22. The band 20 is preferably formed of an elongated strip of polyester or other suitable non-metallic material.

Once the foam material 12 has been applied to cover the sharp edges, discontinuities, irregularly shaped areas and heat-sensitive components of the aircraft 10, or at least the portion to be packaged, the aircraft 10 is wrapped with the shrink film. Although it may be possible to wrap the entire aircraft 10, or at least the entire portion or portions of the aircraft to be packaged, utilizing a large single sheet of shrink film, preferably, for ease of handling, the aircraft 10 is wrapped with a plurality of separate individual sections of the shrink film 24. The individual shrink film sections may be of any desired size or shape, depending upon the size and shape of the portion or area of the aircraft 10 being wrapped. The individual sections of the shrink film 24 may be pre-cut at a remote location and marked or tagged to correspond to particular areas of the aircraft. Alternatively, the individual shrink film sections may be cut on location at the time they are applied to the aircraft 10. A band of suitable non-metallic material, similar to band 20, may be installed around the shrink film sections, if needed, to secure the film to the aircraft 10. Preferably, each band is self-locking or is secured to itself utilizing buckles or some other securing means.

Figure 5:
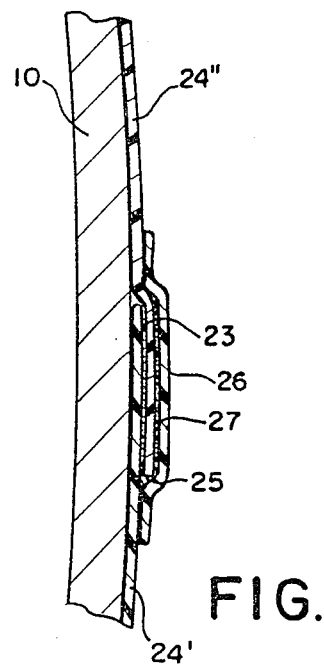
FIG. 5 is a greatly enlarged sectional view of a portion of the helicopter of FIG. 1 showing two overlapping film sections with a reinforcing strip applied.
Figure 6:
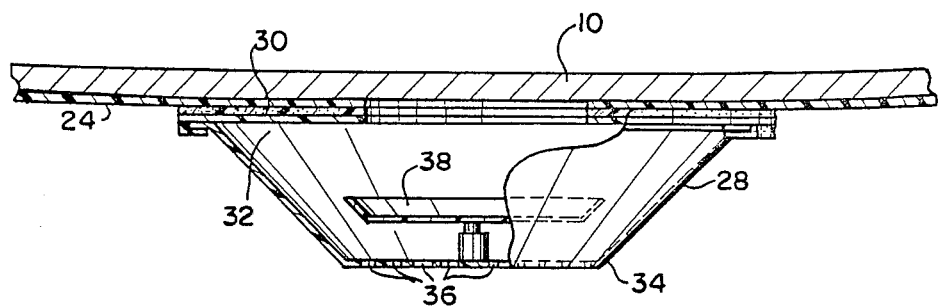
FIG. 6 is a greatly enlarged sectional view of a portion of the helicopter of FIG. 1 showing the installation of a vent member.

The shrink film sections are wrapped around the aircraft 10 so that adjoining sections at least partially overlap each other to provide a generally continuous covering, best shown in FIG. 5. The amount or width of the overlap varies, depending upon the circumstances, but preferably the width of the overlap is about two to six inches. It is also preferable, although not critical, that the overlapped portion be generally horizontal with the overlapping or outer film section 24' being the top section and the overlapped or inner film section 24" being the lower section. This manner of overlapping helps to prevent moisture from penetrating the packaging through the seams 25 formed by the overlapping of the shrink film sections. A layer of adhesive 23 may be applied between the overlapped portions of the shrink film sections to secure the two overlapping sections together. The two overlapped shrink film sections 24' and 24" may also be fused together and sealed utilizing heat in a manner which will hereinafter be described.

The shrink film 24 utilized in connection with the presently preferred embodiment is made from a heavy duty grade of low density polyethylene and is adapted to shrink in both the lateral and longitudinal directions upon the application of heat. Preferably the film 24 meets or exceeds Federal Specification L-P-378D, Plastic Sheet and Strip, Thin Gauge Polyolefin, Classified as Type N, Class 3, Grade B, Finish I. The preferred shrink film 24 is approximately seven mils thick and may be obtained in a variety of widths extending from twelve feet to thirty-two feet, depending upon the size and shape of the aircraft 10, or portion(s) thereof, being packaged. The shrink film 24 may include an ultraviolet inhibitor to protect the aircraft from the ultraviolet effects of the sun. It will be appreciated by those skilled in the art that while the previously described shrink film 24 is presently preferred, the present invention is not limited to the use of the same type and/or size shrink film and that any other suitable shrink film could alternatively be utilized.

Once the shrink film 24 has been wrapped around the aircraft 10 or the portion of the aircraft to be packaged, heat is applied to the sections of heat shrinkable film 24 to shrink the film sections to tightly conform to the aircraft 10 or the portion(s) of the aircraft 10 being packaged. It may be desirable to temporarily secure the film sections to the aircraft 10 prior to heating, using suitable straps or the like. Preferably, the lower or underlying film sections 24' are heated and shrunk prior to the shrinking of the upper or overlying shrink film sections 24". In addition to shrinking the film, the application of heat causes the overlapping film sections to be fused together and causes the foam material to be heated so that the areas of the film sections adjoining the foam material 12 are fused to the foam material. In this manner, the shrink film 24 is secured to the foam material 12 and, thus, to the aircraft 10. When the shrinking and fusing of the film has been completed, the aircraft 10 is enclosed in a generally airtight, tightly fitting covering.

In applying heat to the heat-shrinkable film 24, it is preferable to use a portable propane or other gas-powered heat gun (not shown) of the type shown and described in U.S. Pat. No. 4,631,023. However, any other type of heat gun, such as an electrical hot forced air gun or any other heating method, such as infrared radiation, could be employed for heating and shrinking the shrink film 24. The heating temperature required to shrink the film varies, depending upon the type and thickness of the shrink film employed. In the case of the above-described polyethylene film, the film begins to shrink at between 325 and 375 degrees Fahrenheit. When applying the heat, the operator should exercise caution and not apply too much heat at any one location to avoid burning holes through the shrink film 24. If holes or openings in the shrink film 24 are created, they may be patched utilizing an additional piece of shrink film and/or an appropriate length of tape 14 in a manner well known in the shrink film art.

As previously indicated, it is desirable to provide a shrink film package which is substantially airtight, and which will withstand extreme weather conditions, and provide good protection for the enclosed aircraft 10. It has been determined by the inventor that the weakest portions of the above-described packaging are the seams 25 formed where the adjoining, overlapping sections of the shrink film are fused together. It has been found that high winds, strong rain, and other such weather conditions may cause the bond between the overlapping sections of shrink film 24 to deteriorate, thereby permitting dust, moisture and the like to penetrate the packaging. In addition, because of the shrinking of the film, the seams 25 between the overlapping adjoining film sections are subject to substantial tension and sometimes separate in part. In order to reinforce the seams 25 between adjoining sections of the shrink film, elongated strips 26 of heat-shrinkable material are applied along the seams 25, as shown in FIG. 5. The strips 26 are preferably about six to eight inches wide and in the preferred embodiment are formed of the same material as the shrink film 24. The strips may be held in place by a suitable spray or paint-on adhesive 27 of the type previously described. Alternatively, the film strips 26 could comprise an adhesive-backed tape 26' (see FIG. 1) of the type previously described for securing the foam material 12 to the aircraft 10.

Once the shrink film strips 26 have been secured over the seams 25, heat is applied to the strips 26 to shrink the strips and fuse them to both of the adjoining film sections 24' and 24", as best seen in FIG. 5. By applying the shrink film strips 26 in this manner, the seams 25 are reinforced and sealed to provide stronger, weathertight packaging.

In storing and/or shipping a packaged aircraft 10 of the type described above, it is desirable to provide for the removal of moisture which may be trapped between the shrink film 24 and the aircraft 10. In addition, it is sometimes desirable to provide for the circulation of small amounts of air within the shrink film packaging. Therefore, vent means, in the present embodiment, a vent member 28, is installed on the shrink film 24 at the lowest point in the shrink film packaging. The vent member or vent 28 of the present embodiment is generally frustoconical with a generally open interior and includes an adhesive coating 30 on the surface of the base 32 of the frustum to facilitate securing the vent member 28 to the shrink film 24. Once the vent member 28 has been secured to the shrink film 24, a generally circular portion of the shrink film within the center of the vent member 28 is removed. The other end 34 of the vent includes a plurality of small openings 36 to permit drainage of moisture and circulation of air, yet preclude moisture, particles or the like from directly entering the opening in the shrink film 24. A generally circular plate member 38 is disposed between the vent openings 36 and the opening in the film to prevent direct exposure of the aircraft surface to the elements.

Aircraft of the type to be packaged, particularly aircraft being shipped overseas, typically contain certain amounts of fuel, lubricants, etc. for testing and in order to permit them to be quickly serviced and operational once they reach their final destination. When applying heat to shrink the various sections of shrink film 24, caution must be taken to avoid explosion or fire which may be caused by overheating of such fuels or lubricants and/or any fumes which may be emitted therefrom. It is best to place the above-described foam material 12 over any known fuel or lubricant storage cavity to provide heat insulation. In addition, since many of the fuel and lubricant storage cavities are vented, such vents should be identified and blocked before the shrink film 24 is applied to prevent the build-up of fumes within the shrink film. After the application of the shrink film has been completed, the shrink film should be removed from the vents and the vents should be unblocked to permit proper venting to avoid a build-up of fumes and/or pressure within the fuel or lubricant storage cavities during storage and/or shipment.

Figure 4:
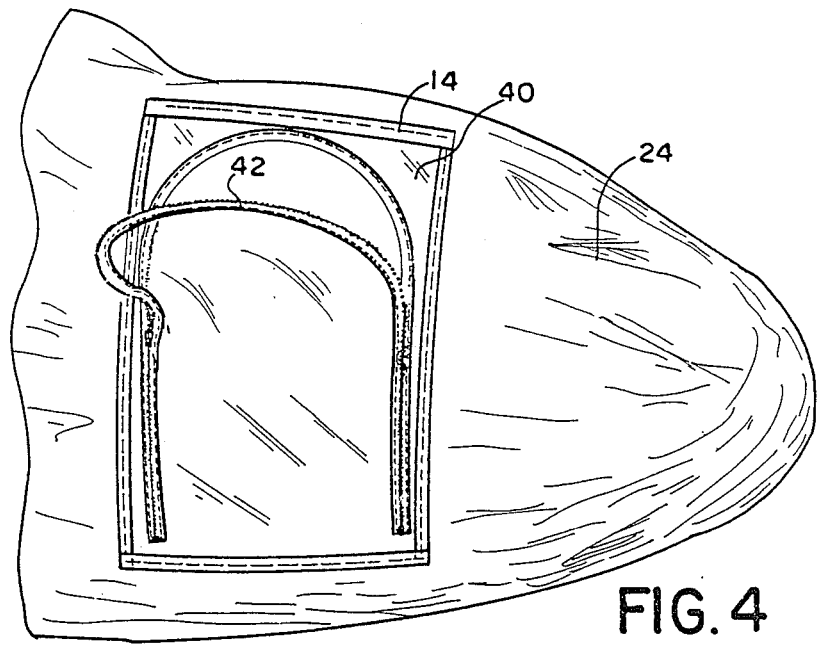
FIG. 4 is an enlarged perspective view of another portion of the helicopter of FIG. 1 showing the installation of an access cover.

Referring now to FIG. 4, there is shown an enlarged perspective view of the forward portion of the helicopter 10 of FIG. 1. The helicopter 10, as with most other aircraft, includes one or more access openings to the interior of the aircraft. Such access openings may include doors, windows, inspection ports, or the like, and are designed to permit entry into the aircraft, for example, by personnel for transport, servicing of the aircraft, etc. When an aircraft of this type is to be stored for an extended period of time, it is desirable to have the ability to gain access to the interior of the aircraft through such access openings to facilitate movement of the aircraft, for servicing, and for keeping accurate track of the condition of the interior of the aircraft. Access to the interior of the aircraft is particularly important when transporting the aircraft from one location to another in order to facilitate the application or release of the brakes and/or any steering which may be required.

In order to afford such access without affecting the packaging, the invention further includes a reclosable access cover which is installed over such an access opening. In the present embodiment, the access cover is comprised of a generally rectangular cover member 40 having an overall dimension which is greater than the dimension of the access opening being covered. The access cover member 40 includes a self-contained zipper-activated door 42. The access cover member 40 is installed so that it overlaps the access door opening. Adhesive-backed heat-shrinkable tape 14 of the type previously described is installed around the edges of the access cover member 40 as shown in FIG. 4. The tape is then heated as previously described to fuse the cover member 40 to the heat shrink film 24 which has already been applied to the aircraft 10. Once the cover member 40 has been secured, the zippered door 42 is opened and the shrink film is removed from over the aircraft access opening to provide unimpaired access to the interior of the aircraft 10. Thereafter, the door 42 is zipped shut to again cover the access opening. Alternatively, instead of employing the cover member 40, a section of heat shrink film (not shown) of approximately the same size could be employed. The section of heat shrink film could be formed into a flap-type cover, one edge of which is fused to the heat shrink film on the aircraft, the other three edges of which are removably secured to the heat shrink film on the aircraft utilizing tape or any other suitable, removable securing means.

From the foregoing description, it can be seen that the present invention comprises a shrunk-on packaging for an assembled aircraft or portion thereof, and a method of making the same utilizing heat shrinkable polymer film. It will be appreciated by those skilled in the art that changes could be made to the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. A method of shrink film packaging an assembled aircraft or portion thereof for transport, storage or the like, the method comprising the steps of:
    covering exposed jagged or sharp edges and discontinuities, exposed irregularly shaped areas, and exposed heat-sensitive components of the aircraft or portion thereof with a foam material, the foam material providing cushioning to prevent puncturing of the film, heat insulation for the heat sensitive components, and anchoring areas for securing the film to the aircraft or portion thereof;
    wrapping the aircraft or portion thereof with a plurality of separate sections of heat shrinkable polymer film, adjoining sections of the film at least partially overlapping to provide a generally continuous covering;
    applying heat to the heat shrinkable film sections to shrink the film to tightly conform to the aircraft or portion thereof to provide a generally airtight covering, to fuse together the overlapping film sections and to fuse portions of the film to adjoining foam material;
    applying elongated strips of heat shrinkable material along seams formed by the fusing together of the overlapping film sections; and
    applying heat to the elongated strips to shrink and fuse the strips to the film sections on both sides of the seams to seal and reinforce the seams.

2. The method as recited in claim 1 wherein the foam material comprises a thermoplastic foam.

3. The method as recited in claim 2 wherein the thermoplastic foam is formed of low density polyethylene.

4. The method as recited in claim 1 wherein the foam material is at least one-fourth of an inch thick.

5. The method as recited in claim 1 wherein the foam material is secured in place by adhesive-backed polyethylene tape.

6. The method as recited in claim 1 wherein the foam material is secured in place utilizing a plastic adhesive.

7. The method as recited in claim 1 wherein the foam material is secured in place utilizing an elongated band which is secured to itself around the foam material.

8. The method as recited in claim 1 wherein the heat shrinkable film is a low density polyethylene film.

9. The method as recited in claim 1 wherein the film is at least seven mils thick.

10. The method as recited in claim 1 wherein prior to applying the heat to the film each film section is held in place by a band which is secured to itself surrounding the film section.

11. The method as recited in claim 1 wherein the heat is applied utilizing a portable heat gun.

12. The method as recited in claim 1 wherein the elongated strips of heat shrinkable material are formed from the same material as the heat shrinkable film sections.

13. The method as recited in claim 1 wherein the elongated strips of heat shrinkable material are comprised of a heat shrinkable adhesive-backed tape.

14. The method as recited in claim 1 further comprising the steps of:
 identifying the lowest point of the shrink film packaged aircraft or portion thereof; and
 installing a vent at said lowest point, the vent extending through the film to permit drainage of moisture from within the shrink film packaging.

15. The method as recited in claim 1 wherein the aircraft or portion thereof includes at least one access opening to the interior thereof, the method further comprising the steps of:
 installing a reclosable access cover over the access opening, the access cover being larger than the access opening;
 opening the access cover and removing the portion of the film covering the access opening; and
 reclosing the access cover.

16. The method as recited in claim 15 wherein the reclosable access cover is comprised of a zipper door assembly and wherein the zipper door assembly is secured around the access opening using heat shrinkable tape which is heated to fuse the zipper door assembly to the shrink film around the access opening.

17. Shrunk-on film packaging for an assembled aircraft or portion thereof for transport, storage or the like, comprising:
 a covering of foam material on exposed jagged or sharp edges and discontinuities, exposed irregularly shaped areas and exposed heat sensitive areas of the aircraft or portion thereof;
 a plurality of separate sections of heat shrinkable polymer film wrapped around and heat shrunk on the aircraft or portion thereof with at least portions of adjoining film sections overlapping and fused together to provide a generally airtight covering which tightly conforms to the aircraft or portion thereof, portions of the film sections being fused to adjoining foam material; and
 elongated strips of heat shrinkable material heat shrunk along seams formed by the fusing together of the overlapping film sections to seal and reinforce the seams.

18. The packaging as recited in claim 17 wherein the foam material is a low density polyethylene film at least one-fourth inch thick.

19. The packaging as recited in claim 18 wherein the heat shrinkable polymer film is a low density polyethylene film.

20. The packaging as recited in claim 19 further comprising a vent extending through the lowest portion of the shrink film to prevent drainage of moisture from within the packaging.

21. The packaging as recited in claim 20 wherein the aircraft or portion thereof includes at least one access opening to the interior thereof, the packaging further including a reclosable access cover extending over the access opening.

* * * * *